Figure 1:
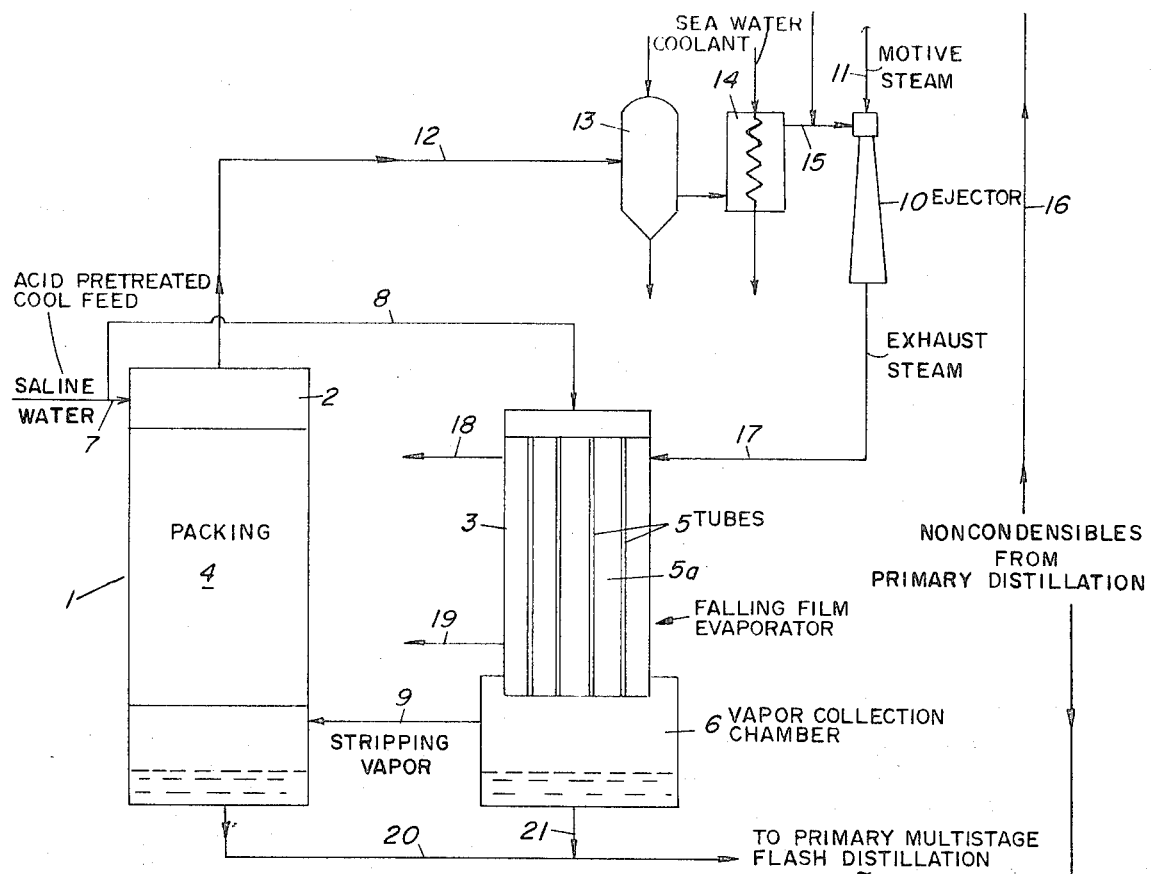

United States Patent [19]

Sieder

[11] 3,766,020
[45] Oct. 16, 1973

[54] STEAM JET EJECTORS TO REDUCE PRESSURE IN AND PRODUCE STRIPPING STEAM FOR DEAERATOR

[75] Inventor: Everett N. Sieder, Ft. Lauderdale, Fla.

[73] Assignee: The United States of America as represented by the Secretary of the Interior, Washington, D.C.

[22] Filed: Oct. 27, 1971

[21] Appl. No.: 192,842

[52] U.S. Cl............ 203/26, 203/4, 203/11, 202/173, 202/236, 159/13 A, 159/24 B, 159/17 VS
[51] Int. Cl....... B01d 3/00, B01d 1/22, B01d 3/02, B01d 1/00, B01d 3/08, B01d 3/10
[58] Field of Search............ 159/DIG. 16, 13, 159/13 A, 2 MS, 46, 17 R, 24 B, 17 VS; 203/10, 11, 7, 100, 4, 24, 26; 202/173, 236, 174

[56] References Cited
UNITED STATES PATENTS

| | | | |
|---|---|---|---|
| 1,200,996 | 10/1916 | Soderlund et al. | 159/17 R |
| 2,764,233 | 9/1956 | Skinner | 159/17 R |
| 3,354,932 | 11/1967 | Hester et al. | 159/17 R |
| 3,458,972 | 8/1969 | Sood | 202/174 X |
| 3,489,654 | 1/1970 | Gerringer | 203/26 |
| 3,487,873 | 1/1970 | Bromley et al. | 159/13 A |

Primary Examiner—Jack Sofer
Attorney—Ernest S. Cohen et al.

[57] ABSTRACT

Predeaeration system in which a stream of cool saline water is split into two streams, one being sent to a deaerator vessel, the other being sent to an LTV evaporator to provide gas stripping vapor for the deaerator. One or more steam jet ejectors reduce the pressure in the deaerator and remove noncondensibles from a primary distillation system. Exhaust motive steam from the ejectors is used to heat the LTV evaporator.

7 Claims, 2 Drawing Figures

STEAM JET EJECTORS TO REDUCE PRESSURE IN AND PRODUCE STRIPPING STEAM FOR DEAERATOR

This invention relates to a system for removing dissolved gases from saline water.

It is well known that corrosion and scale formation during distillation or evaporation of saline water (e.g., sea water) can be minimized by removing dissolved oxygen and carbon dioxide from the water prior to passage to the distillation unit. Many problems are encountered in currently practiced degasification or deaeration techniques including the fact that valuable high pressure steam is often taken from the main distillation system, to the detriment thereof, and employed as a gas stripping medium in the deaerator.

We have now developed a new and improved deaeration or degasification system generally comprising a degasifier vessel (usually referred to as a deaerator) in combination with a long-tube vertical (LTV) evaporator. Most of the cool sea water feed is sent to the top of the deaerator while a small fraction thereof, preferably less than 10 percent but more than 2 percent, is sent to the top of the LTV to pass downwardly through its tubes as a falling film. Vapor generated within the tubes is withdrawn therefrom and conveyed to the deaerator to pass countercurrently or concurrently through the cool sea water as a gas stripping medium.

Degassed liquid which collects at the bottom of the deaerator is then mixed with unvaporized liquid withdrawn from the bottom of the LTV evaporator, and the combined stream is then employed as the feed stream to the main purification plant such as a MSF (multistage flash) or MEMS (multieffect, multistage) unit.

Heating of the falling film of sea water in the LTV unit is accomplished with exhaust motive steam from steam jet ejectors which ejectors are employed to create a vacuum in the deaerator and to remove noncondensibles from the vessels in the main purification plant.

It is therefore an object of the present invention to effectively degasify saline water prior to production of potable water.

Another object is to provide degasification prior to distillation.

A further object is to produce gas stripping steam for the deaerator in an LTV unit extraneous to the main distillation system.

A still further object is to employ as the heating medium in the LTV unit the steam previously employed to create a reduction in pressure in the deaerator and to remove noncondensibles from the system.

Figure 2:
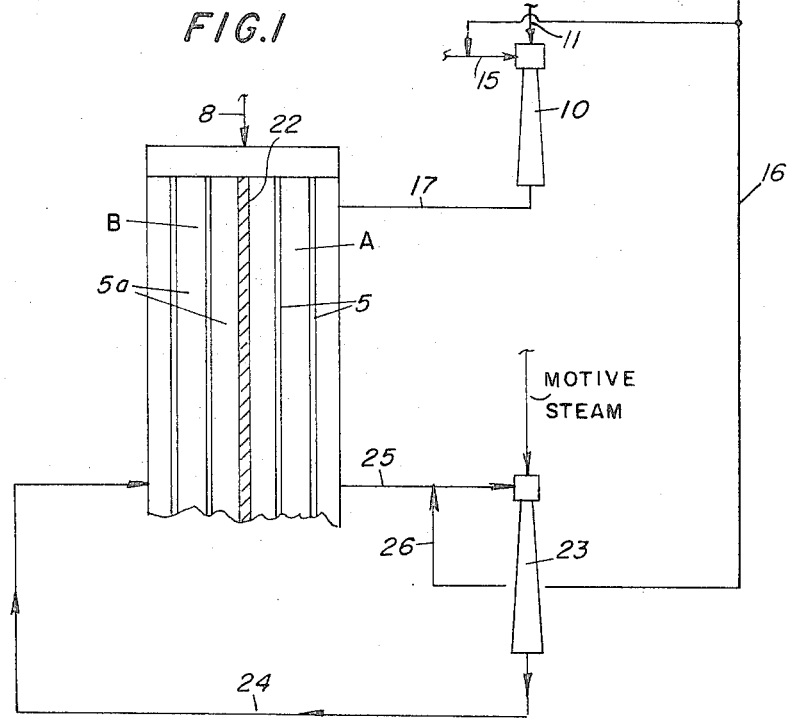

Other objects and advantages will be obvious from the following more detailed description of the invention taken in conjunction with the drawing in which FIG. 1 is a schematic view of the overall system of the present invention; and FIG. 2 is a fragmentary view of a preferred embodiment.

Referring to FIG. 1, reference numeral 1 designates the degasification system of the present invention having a deaerator chamber 2 and an LTV evaporator 3. Deaerator 2 contains packing 4 or other devices employed in the prior art manner to bring about intimate contact between liquid and vapor. The main elements of LTV evaporator 3 are a plurality of tubes 5, a shell side (heating side) 5a and a collection chamber 6.

Incoming cool sea water which has been pretreated with acid in the prior art manner is split into two streams and fed to chamber 2 and evaporator 3 through conduits 7 and 8, respectively. As the cool sea water descends through packing 4 in deaerator 2, it is stripped with countercurrently flowing water vapor which is delivered into the deaerator through conduit 9 from collection chamber 6 located at the bottom of LTV evaporator 3.

Reduction in pressure in deaerator 2 is attained by the use of a steam jet ejector 10 having motive steam fed thereto through conduit 11. As such, vapor and noncondensibles are withdrawn from deaerator 2 through conduit 12 and pass through a series of condensers such as a barometric condenser 13 and a heat exchanger 14 having raw sea water as coolant. Noncondensibles are ultimately drawn into the ejector 10 through conduit 15. Ejector 10 can additionally be employed to evacuate noncondensibles through conduit 16 from evaporators in the main or primary purification system.

Cool sea water, which enters the top of LTV evaporator 3 through conduit 8, passes downwardly as a falling film through tubes 5. Exhaust steam from ejector 10 is introduced to the shell side 5a of the tubes 5 through conduit 17 to vaporize a portion of the falling film within the tubes. Uncondensed gases and any condensate are removed from the shell side 5a through conduits 18 and 19, respectively. Resultant water vapor and residual liquid within tubes 5 pass out the bottom of the tubes into collection chest or chamber 6. As previously indicated, vapor in the collection chest is then drawn into the deaerator 2 through conduit 9 to thereby act as a gas stripping means.

Degassed sea water at the bottom of deaerator 2 passes through conduit 20 to a water purification system such as a multistage flash distillation unit. Partially concentrated sea water in the bottom of collection chest 6 in LTV evaporator 3 is removed therefrom through conduit 21 to be mixed with the liquid in conduit 20.

As shown in FIG. 2, shell side 5a of evaporator 3 can be partitioned with wall 22 into a plurality of separate heating chambers A and B. While chamber A is heated via exhaust steam from ejector 10, a second ejector 23 is provided to supply exhaust steam through conduit 24 as the heating medium for chamber B. Latter ejector 23 is employed to withdraw uncondensed gas from chamber A through conduit 25. Additionally, noncondensibles in the evaporators in the main purification plant are drawn through conduit 26 into ejector 23. Noncondensibles and condensate in chamber B are withdrawn through suitable conduits (not shown).

The following example illustrates a typical operation of the embodiment of FIG. 2.

898,000 pounds/hour of sea water were sent to the deaerator system; 848,000 pounds/hour going directly to the deaerator chamber, 50,000 pounds/hour being sent to the LTV evaporator. The evaporator has 124 tubes 10 feet long, 2 inches diameter. A steam jet ejector. Exhaust steam from the ejector was fed at jector provided a pressure of 1 inch Hg absolute in the deaerator. Exhaust steam from the ejector was fed at a rate of 595 lbs/hr into chamber A of the LTV evaporator. A second ejector which removed uncondensed gases from chamber A supplied steam at a rate of 616 lbs/hr to chamber B of the LTV evaporator.

Stripping vapor from the evaporator entered the bottom of the dearator at a rate of 1,140 lbs/hr. The combined liquid streams removed from the deaerator and LTV unit, and thereafter sent to the primary distillation plant, was 897,000 pounds/hour.

I claim:

1. Apparatus for degasifying saline water which degasified water is then fed as distilland to a primary multistage flash distillation plant comprising:
   a. a deaeration vessel consisting essentially of a substantially enclosed vessel having a collection space at the top and bottom thereof, and containing a packing disposed between said collection spaces;
   b. steam jet ejector means in a communication with said vessel to reduce the pressure therein, and to remove noncondensibles from evaporators in said primary distillation plant;
   c. a long tube vertical (LTV) evaporator;
   d. first conduit means connected at one end to a supply of saline water, and connected at the other end to the top of said deaeration vessel so that saline water passes downwardly through said packing;
   e. second conduit means connected at one end to said supply of saline water, and connected at the other end to the top of said LTV evaporator so that saline water passes downwardly as a falling film through the tubes of said LTV evaporator;
   f. means to inject exhaust motive steam from said ejector means into the shell side of said LTV evaporator to generate vapor from said saline water flowing down said tubes;
   g. means to pass said generated vapor to the bottom of said deaeration vessel so that said vapor rises up through said packing to directly contact said saline water and strip gas from said saline water in said deaeration vessel;
   h. third conduit means connected at one end to the bottom of said deaeration vessel to remove degasified water from said deaeration vessel, and connected at the other end to fourth conduit means to supply said degasified water to said fourth conduit means;
   i. fifth conduit means connected at one end to the bottom of said LTV evaporator to remove unvaporized saline water from said LTV evaporator, and connected at the other end to said fourth conduit means to supply said unvaporized water to said fourth conduit means to thereby combine with said degasified water and form combined liquid; and
   j. means connected to said fourth conduit means to feed said combined liquid as said distilland to said primary multistage flash distillation plant.

2. The apparatus of claim 1 wherein a collection chamber is provided at the bottom of said tubes of said LTV evaporator; wherein said unvaporized saline water passes out the bottom of said tubes into said chamber; and wherein said generated vapor is withdrawn from said tubes into said chamber.

3. The apparatus of claim 1 wherein said shell side of said LTV unit is divided into two separate chambers, wherein said ejector provides heating steam for one of said chambers, wherein a second ejector provides exhaust motive steam as the heating medium for the other of said chambers, wherein said second ejector withdraws uncondensed gases from said first chamber and also withdraws noncondensibles from evaporators in said primary distillation plant.

4. A process for degasifying saline water prior to feeding it as distilland to a primary multistage flash distillation zone comprising:
   a. splitting said saline water into first and second streams;
   b. stripping gas from said first stream of said water in a deaeration zone wherein the only heating medium is the stripping medium;
   c. reducing both the pressure in said zone and removing noncondensibles from said primary distillation by steam jet ejection;
   d. generating vapor from said second stream of said water by passing said second stream downwardly, as falling film, through an evaporation zone;
   e. employing said generated vapor as a gas stripping medium in said deaeration zone by countercurrently contacting said first stream with said vapor as said first stream descends through said deaeration zone;
   f. employing exhaust motive steam from said steam jet ejection as a heating medium in said evaporation zone;
   g. removing deaerated saline water from said deaeration zone;
   h. removing unvaporized saline water from said evaporation zone;
   i. combining said removed deaerated water and said removed unvaporized water; and
   j. feeding said combined water to said primary multistage flash distillation zone as said distilland.

5. The process of claim 4 wherein said second stream of water constitutes less than 10 percent but more than 2 percent of said saline water.

6. The process of claim 4 wherein said second stream of saline water is vaporized in said evaporation zone in first and second separated zones; wherein said exhaust motive steam from said steam jet ejection is injected into the heating side of said first zone; wherein uncondensed gases are removed from said heating side by an additional steam jet ejection step; and wherein exhaust motive steam from said additional steam jet ejection heats said second zone.

7. The process of claim 6 wherein both of said steam jet ejections remove noncondensibles from evaporation zones in said primary distillation process.

* * * * *